United States Patent [19]
Berger et al.

[11] Patent Number: 5,982,290
[45] Date of Patent: Nov. 9, 1999

[54] AUTOMATIC RECOGNITION OF DIFFERENT TYPES OF LIQUID LEVEL SENSORS

[75] Inventors: John G. Berger, Landisville; Mark K. Chow, Paoli, both of Pa.

[73] Assignee: New Holland North America, Inc., New Holland, Pa.

[21] Appl. No.: 09/151,093

[22] Filed: Sep. 10, 1998

[51] Int. Cl.[6] .................................................. G08B 21/00
[52] U.S. Cl. ........................ 340/618; 340/450; 340/450.2
[58] Field of Search ............................ 340/450.2, 450.3, 340/450, 521, 522, 603, 612, 618, 619, 620, 623; 73/308, 313

[56] References Cited

U.S. PATENT DOCUMENTS

| | | | |
|---|---|---|---|
| 4,250,750 | 2/1981 | Martinee et al. | 73/308 |
| 4,442,424 | 4/1984 | Shirasaki et al. | 340/462 |
| 4,450,528 | 5/1984 | Yaegashi et al. | 701/103 |
| 4,493,303 | 1/1985 | Thompson et al. | 123/357 |
| 5,524,643 | 6/1996 | Faries, Jr., et al. | 128/849 |
| 5,532,673 | 7/1996 | Olsen et al. | 340/450.2 |

*Primary Examiner*—Daniel J. Wu
*Assistant Examiner*—Van T. Trieu
*Attorney, Agent, or Firm*—Griffin, Butler, Whisenhunt & Szipl, LLP

[57] ABSTRACT

A system for indicating the level of a liquid in a container is operable with either an analog type liquid level sensor producing an output signal which varies linearly in magnitude with the level of liquid, or a digital liquid level sensor producing a cyclic pulse width modulated signal which varies in duration according to the liquid level. One or the other type sensor is connected to an analog wire and a microprocessor is programmed to detect positive and negative going edges of pulses on the wire and generate values representing the duration of the pulses. If pulse edges are detected, the microprocessor uses the generated values representing the duration of the pulses to access a conversion table and obtain a multi-bit value for energizing the display. If no pulse edges are detected, the magnitude of the signal on the analog wire is converted to an equivalent digital value which is applied to a second conversion table to derive a multi-bit value for energizing the display. The liquid may be a fuel and the container may be the fuel tank of a vehicle.

6 Claims, 2 Drawing Sheets

AUTOMATIC RECOGNITION OF DIFFERENT TYPES OF LIQUID LEVEL SENSORS

FIELD OF THE INVENTION

This invention relates to liquid level indicator systems and more particularly to a method and apparatus for determining whether a liquid level sensor providing input to the system is an analog type or a digital (pulse type) sensor. The invention will be described with reference to the measurement and indication of the fuel level in the tank of a vehicle but it is applicable to systems for indicating the level of any liquid in any container.

BACKGROUND OF THE INVENTION

Sensors using analog technology for determining the level of fuel in a vehicle fuel tank have long been known. These sensors may employ a variation in resistance, capacitance, etc. with fuel level to develop an analog output signal having a magnitude proportional to the level of fuel in the tank. The signal may be applied to the coil of a visual fuel level indicator to displace a pointer over a dial or it may be converted to a digital value for driving a numeric or a bar graph display. In the case where a variation in resistance is employed to develop the output signal, the variation in resistance may be obtained by using a float element which floats on the surface of the fuel and selectively closes switches to change the resistance in the sensor circuit as the fuel level changes. A typical fuel gauge of this type is disclosed in U.S. Pat. No. 5,532,673.

More recently, sensors employing digital technology have been developed. These sensors have no moving parts and produce a cyclic pulse width modulated signal indicating the level of fuel in the tank. The digital type sensor will function with a dial and pointer type indicator because the pointer driving coil of the indicator averages the pulse width modulated signal. However, the digital sensor and analog sensor output signals must be processed differently in order to develop an output signal for driving a numeric or a bar graph display.

Since the pulse type sensors have no moving parts and are generally more reliable than sensors employing analog technology, it is desirable to use them on newly produced vehicles and as replacement sensors on older vehicles. Also, it is desirable that the two types of sensors be interchangeable so that, in the event of sensor failure, either type may be used as a replacement part depending on availability. These options are available only if the controller which processes the signals for numeric or bar graph display is capable of automatically recognizing which type of sensor is currently installed on a vehicle.

SUMMARY OF THE INVENTION

An object of the present invention is to provide a method and apparatus for determining whether the liquid level sensor installed in a system is an analog or a digital type sensor.

Another object of the present invention is to provide a method and apparatus for determining whether the fuel level sensor installed on a vehicle is of the analog type producing an output signal having a magnitude proportional to the fuel level or the digital type producing a pulse width modulated signal having a pulse duration proportional to the fuel level.

A further object of the invention is to provide a system for indicating fuel level via a numeric or a bar graph display, the system being operable with sensors of the type producing an analog signal or sensors of the type producing a pulse width modulated signal.

Yet another object of the invention is to provide a liquid level indicator system including a display responsive to bits of a digital signal for indicating the level of liquid in a container, the system being operable with either an analog type liquid level sensor or a digital type liquid level sensor connected to an input wire, the system including a microprocessor programmed to determine, from a characteristic of a signal on the wire, the type of sensor connected to the wire, the microprocessor being programmed to process the signal on the wire in one way to develop the digital signal for energizing the display when it is determined that an analog type liquid level sensor is connected to the wire and in a second way to develop the digital signal for energizing the display when it is determined that a digital type liquid level sensor is connected to the wire.

According to the invention, a method for operating a liquid level indicator system with either an analog type liquid level sensor or a digital type liquid level sensor connected to an input wire of the system comprises:

a) sensing samples of a signal on the input wire over an interval of time to detect the presence of negative and positive going pulse edges in the signal;

b) measuring the duration of a pulse between a negative going edge and a positive going edge if both edges are sensed during a sample;

c) at the end of the interval, determining if each sample detected both a negative going and a positive going edge;

d) if step c) determines that both negative and positive going edges were detected in each sample, processing the measured duration of at least one pulse to derive signals for energizing a display; and, e) if step c) determines that both negative and positive going edges were not detected in each sample, digitizing the magnitude of the analog signal on the wire and processing the digitized magnitude to derive signals for energizing the display.

Other objects and advantages of the invention will become evident upon consideration of the following description and the accompanying drawings.

DETAILED DESCRIPTION OF THE INVENTION

Figure 1:
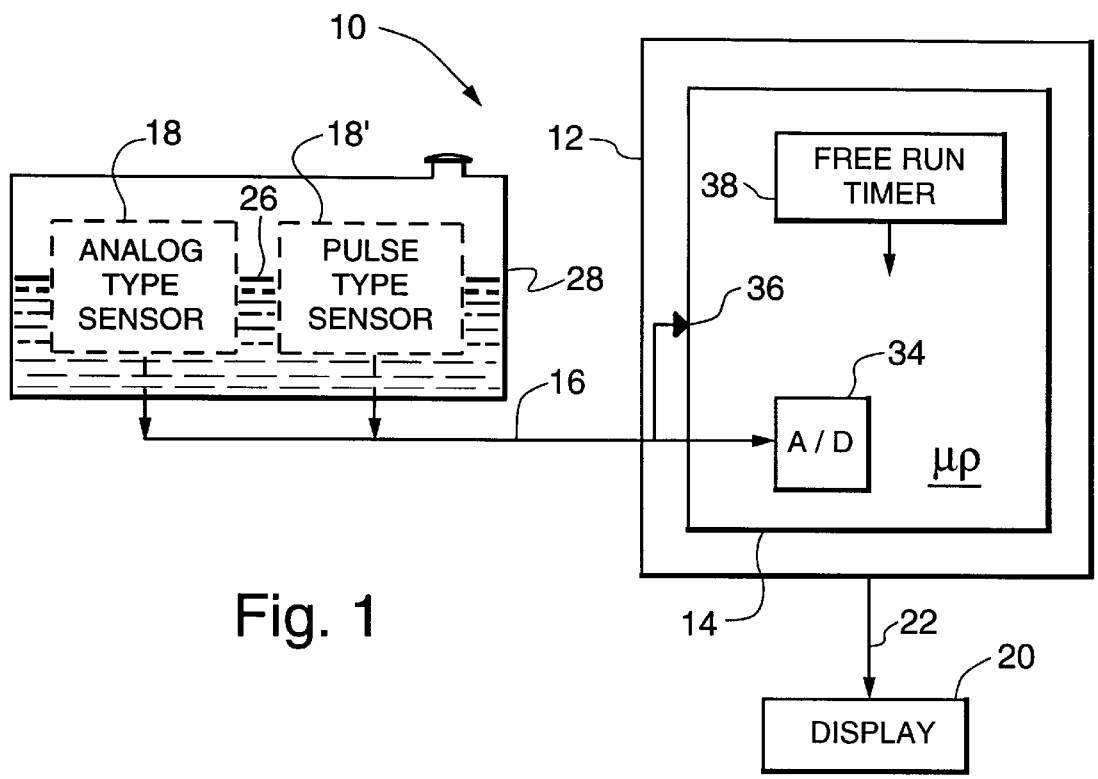
FIG. 1 is a schematic circuit diagram of a liquid level indicator system operable with level sensors producing either an analog or a pulse type output signal.

In FIG. 1, a liquid level indicator system 10 according to the invention comprises a controller 12 having a microprocessor 14 connected by an analog data wire 16 to either an analog type liquid level sensor 18 or a digital or pulse type liquid level sensor 18', and a visual indicator 20, such as a bar graph or numeric display, connected to the microprocessor via a digital data bus 22.

Figure 2A:
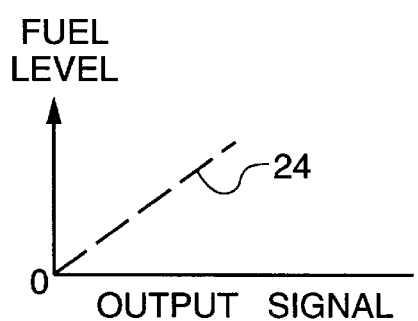
FIGS. 2A and 2B are waveforms representing the output signals produced by an analog type and a pulse type liquid level sensor, respectively; and, FIG. 3 is a flow diagram illustrating a program routine executed by the microprocessor of FIG. 1 to determine the type of sensor currently installed in the system.
Figure 2B:
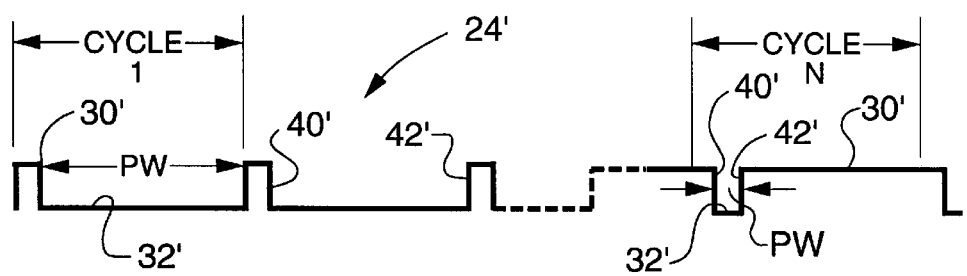

The analog type fuel level sensor 18 is conventional and may be any known sensor producing an analog output signal 24 (current or voltage) having a magnitude which varies linearly as shown in FIG. 2A with the level of liquid (e.g. fuel) 26 in a container (e.g. vehicle fuel tank) 28. The digital type fuel level sensor 18' is also conventional and may be any sensor producing a cyclic pulse width modulated (PWM) output signal 241 as shown in FIG. 2B. Each cycle of output signal 24' includes a "high" or "positive" portion 30' and a "low" or "negative" portion 32', these terms being intended as terms of reference for explaining the invention and not terms of description. During each cycle of signal 24', the durations of the positive and negative portions depend on the sensed level of fuel in the tank 28. For purposes of the following description it is assumed that sensor 18' is one producing an output signal wherein the duration of the negative portion 32' decreases as the level of fuel in tank 28 decreases. In FIG. 2B, cycle 1 represents the pulse width modulated signal when the tank is full and cycle N represents the signal when the tank is empty.

Microprocessor 14 is conventional in that it includes an Analog to Digital Converter (A/D) 34 as well as memories and processing circuits (not shown). The processor may be a Motorola type M68HC11 processor. This processor is programmable to detect edges of a pulse type signal applied thereto from analog data wire 16 via an input 36. Programming for carrying out the edge detection functions described below is set forth in detail in the Motorola M68HC11 Reference Manual, Section 10.

As described in the reference manual, the microprocessor is programmable to operate in a polled mode or an interrupt mode and is further programmable to detect positive going edges of a signal, negative going edges, or both positive and negative going edges. In the present invention, the microprocessor is programmed to operate in the interrupt mode and programmed to alternately detect a negative going edge such as edge 40' in FIG. 2B and then a positive going edge such as edge 42'.

A main program is executed by microprocessor 14 every 32.77 ms. The program includes a fuel sender alogrithm which is executed near the end of the program. As one step in the fuel sender algorithm a bit in a control register is set so that negative going edges of a signal on wire 16 are detected, and a −EDGE interrupt enable bit is set. The next negative going edge detected in the signal from wire 16 causes an interrupt of the main program and an interrupt service routine (−EDGE) is called. This routine first captures and saves the contents of a free running system timer 38. It then sets a Negative Edge Received flag, disables the −EDGE interrupt and enables a positive edge interrupt enable bit. Software control is then returned to the main program.

When a positive going edge is detected in the signal on wire 16, the main program is again interrupted and a second interrupt service routine (+EDGE) is called. This routine first captures the value in the timer 38. It then subtracts from this value the timer value captured during execution of the −EDGE service routine. The difference (R-DIFF) is saved and is an indication of fuel level since it is a measure of the duration of the low portion 32' in one cycle of signal 24'.

After R-DIFF has been stored, a counter PWCalc is incremented to indicate that another time count representing pulse width has been calculated. Both the +EDGE and −EDGE interrupts are then disabled and control is returned to the main program.

In an operative embodiment, the invention was incorporated into a system wherein controller 12 controlled many different functions of a skid steer loader. In this embodiment, the microprocessor 14 executed the main program, and thus enabled the edge detection, once every 32.77 ms. On the other hand, the pulse type sensor 18' used in this embodiment produced a PWM signal 24' at a frequency of about 11 kc. Thus, only one in about 360 cycles of a PWM signal are actually sampled and measured every 32.77 ms. This number may vary widely depending the program repetition rate and sensor output frequency in a particular application.

Figure 3:
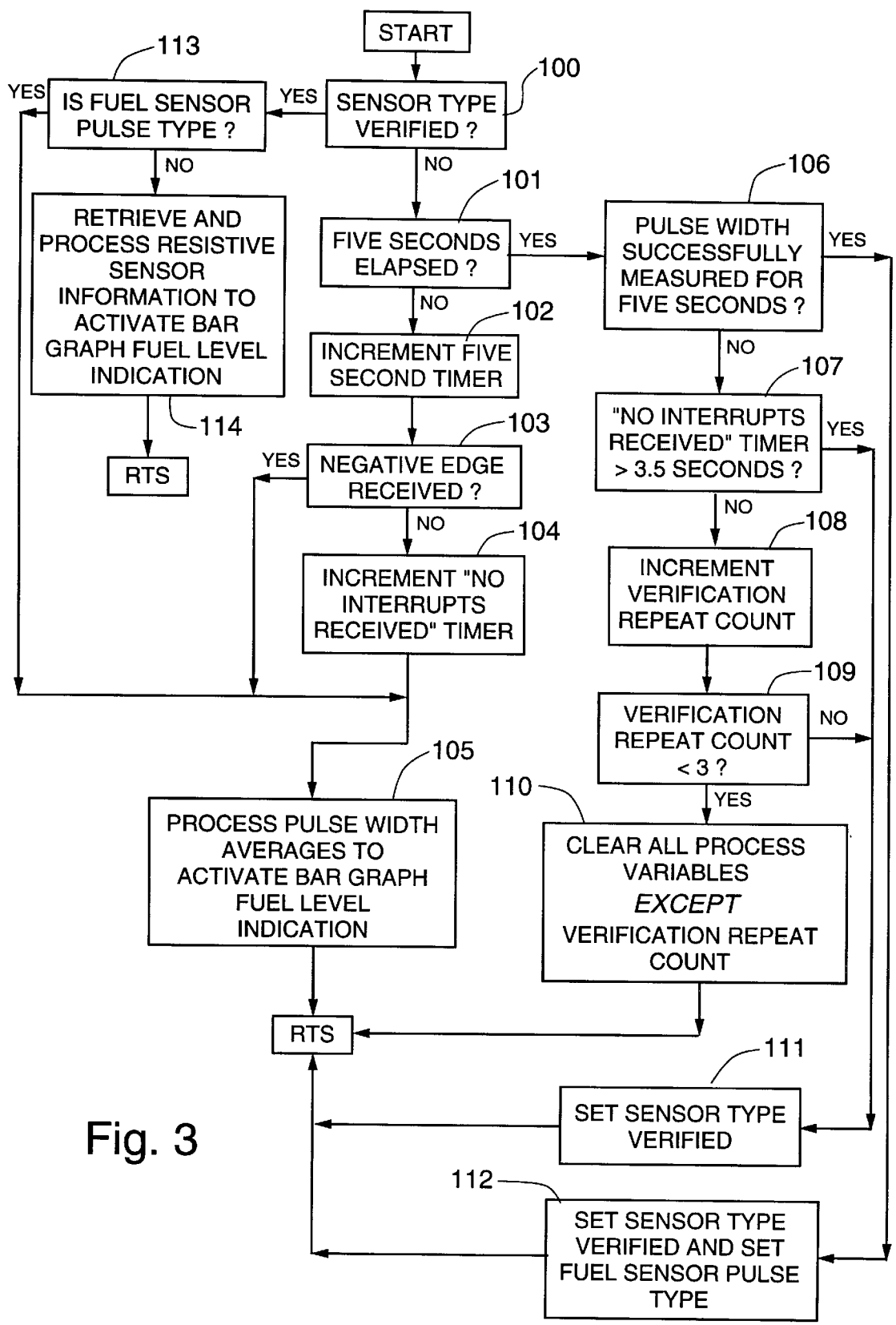

According to the present invention, microprocessor 14 executes a routine as illustrated in FIG. 3 to determine which type of fuel level sensor 18 or 18' is installed on a vehicle. This routine is periodically executed as part of the main program after power is applied to the controller 12 and microprocessor 14. At step 100 a Sensor Type Verified (STV) flag is tested to determine if it is set. This flag is reset at power-up and is set only after the routine has determined the type of sensor 18, 18' connected in the system. Therefore, the first test of the STV flag determines that it is reset and the routine advances to step 101 where a Five Second Timer is tested to determine if 5 seconds have elapsed since power-up. Assuming 5 seconds have not elapsed, the Five Second Timer is incremented at step 102.

The Five Second Timer may be implemented as a register or memory location which, for the first 5 seconds after power up, is incremented each time the routine is executed. Since the routine of FIG. 3 is repeated every 32.77 ms, the timer reaches a count of 153 when approximately 5 seconds have elapsed. Therefore, step 101 tests the timer to determine if it holds a count of 153.

The interval of 5 seconds is not critical. The interval should be long enough to insure that the sensor 18 or 18' is producing a reliable indication of fuel level. However, if the interval is unduly long it may delay an accurate display of the fuel level by the fuel level indicator 20 if an analog type level sensor is connected to wire 16.

After the Five Second Timer has been incremented, step 103 tests the Negative Edge Received (NER) flag. As previously indicated, this flag is set during the −EDGE interrupt routine after a negative edge has been detected in a signal on wire 16.

If step 103 determines that the NER flag has not been set, a No Interrupts Received (NIR) timer is incremented at step 104 before proceeding to step 105. If the NER flag has been set then step 104 is bypassed and the routine advances directly from step 103 to step 105.

The NIR timer may be implemented as a register or memory location which is incremented by one each time the microprocessor reaches step 104. The NIR timer counts the number of main program cycles during which the NER flag is not set because no negative going edge has been detected in the signal on wire 16. The value in the timer, when multiplied by the time it takes to execute one loop of the program, provides an indication of the interval of time that has elapsed without a negative edge being detected.

When step 105 is reached during the first execution of the routine, the type of sensor connected to the microprocessor is still not known. However, at step 105 the microprocessor processes the pulse width information on the assumption that a digital type sensor 18' is connected. To process pulse width information, the microprocessor averages the current value R_DIFF, obtained during the most recently execution of the +EDGE interrupt service routine with the value R_DIFF obtained during several, say seven, preceding executions of the routine. The average of these eight values is then used to access a conversion table. The conversion table then produces a value or combination of bits for energizing display 20. The averaging is done to minimize the effect of any "sloshing" of the fuel such as occurs when a vehicle moves over rough or uneven terrain.

Since no values of R_DIFF have been developed prior to the first execution of step 105, the display 20 will display an indication that there is no fuel in tank 28.

After step 105 is completed, the microprocessor returns to the main program. The microprocessor executes the fuel sender algorithm described above to enable negative detection and initiates a second execution of the main program so that step 100 is reached 32.77 ms after it was first executed. Steps 100–103 and 105 are repeated and, if the NER flag has not been set, step 104 is also executed. Steps 100–103 (and possibly step 104) are repeated for an interval of five seconds.

During the 5-second interval, the energization of display 20 varies depending on whether an analog or a digital type sensor is connected to wire 16. If an analog type sensor 18 is connected, a negative going edge is never detected so the interrupt service routines are not activated to generate R_DIFF. Since R_DIFF remains zero the signals to display 20 cause it to show, throughout the interval, that there is no fuel in the tank.

On the other hand, if a pulse type sensor 18' is connected to wire 16, negative going edges of the signal on wire 16 cause the interrupt service routines to begin developing values of R_DIFF, one during cycle of the main program. As each new value of R_DIFF is developed, the processing at step 105, because of the averaging, produces signals causing display 20 to display an increasing level of fuel. After eight values of R_DIFF have been developed, the display accurately indicates the fuel level.

Five seconds after power-up, the test at step 101 determines that the five second timer holds a value corresponding to five seconds. The program advances to step 106 where the PWCalc counter is tested determine if a PWM signal has been successfully measured or received for the 5-second interval. As previously explained, this counter is incremented by one during execution of the +EDGE interrupt service routine to indicate that one cycle of a PWM signal has been successfully measured. Since the +EDGE interrupt service routine is enabled by the −EDGE interrupt service routine, the latter routine is enabled only once during each execution of the main program, and the main program is executed 153 time during 5 seconds, the PWCalc counter will contain a count of 153 if each execution of the main program resulted in the successful measurement of one cycle of a PWM signal. Step 106 thus checks the PWCalc counter to determine if it holds a count of 153.

If step 106 determines that the PWCalc counter does hold a count of 153 then a PWM signal has been successfully measured for five seconds and a pulse type sensor 18' is connected to wire 16. The routine advances to step 112 where the Sensor Type Verified and a Fuel Sensor Pulse Type flag are both set before returning to the main program. On the next and succeeding executions of the routine, step 100 finds the System Type Verified flag set so the routine advances to step 113 where the Fuel Sensor Pulse Type flag is tested. Since this flag was set at step 112, the routine proceeds to step 105 where the pulse width data is processed as previously described. Thereafter, each time the program reaches step 100, steps 100, 113 and 105 to develop the signals for driving display 20.

If the test at step 106 determines that a pulse width modulated signal has not been successfully measured for five seconds, a test is made to determine if an analog type sensor 18 is connected to wire 16. At step 107, the NIR timer is tested to determine if it holds a count at least as great as 107. Since this timer is incremented at step 104 every 32.77 ms if no negative going edge has been detected in the signal on wire 16, a count of 107 indicates that during at least 3.5 seconds of the interval timed by the 5-second timer a negative going edge did not occur in the signal. This is a good indication that an analog type sensor is connected to wire 16. The routine advances to step 111 where the Sensor Type Verified flag is set before returning to the main program.

Once the Sensor Type Verified flag is set at step 111, the microprocessor processes the signal on wire 16 as an analog signal. The test at step 100 finds that the Sensor Type Verified flag is set so the Fuel Sensor Pulse Type flag is tested at step 113. Since the Fuel Sensor Pulse Type flag has not been set, step 114 is executed to develop the signals for driving display 20. At step 114, the analog signal on wire 16 is sampled and digitized by the analog to digital converter 34. The resulting digital value is then used to access a conversion table to develop the signals for driving display 20.

If the test at step 108 fails to confirm that an analog type sensor is connected to wire 16, a Verification Repeat Counter is incremented at step 108 and tested at step 109 to determine if it contains a count less than 3. If it does, step 110 clears all the process variables except the Verification Repeat Counter before the routine returns to the main program. The entire verification process is then repeated.

Only three attempts are made to verify the type of sensor connected to wire 16. After three unsuccessful attempts, the assumption is made that an analog type sensor is connected to the wire but verification has not been possible because noise or interference has caused spikes in the signal on the wire. Step 109 detects that three attempts have been made and the routine moves to step 111 where the Set Sensor Type Verified flag is set. Since the Fuel Sensor Pulse Type flag is not set, steps 100, 113 and 114 are carried out each time the routine is executed so that the signal on wire 16 is processed as an analog signal.

From the foregoing description it is evident that the present invention provides a novel method and apparatus for automatically adapting a liquid level indicator system with a numeric or a bar graph display for use with either an analog or a pulse type sensor. This is accomplished by identifying the type of sensor connected to the system from characteristics of the sensor output signal, and then processing the sensor output signal according to the identified type.

Although the invention has been described with reference to digital type sensors producing a pulse width modulated signal, the invention is adaptable to distinguish between analog type sensors and other types of sensors producing a digital signal. For example, a digital sensor producing output pulses at a frequency proportional to the liquid level may be distinguished from an analog type sensor by detecting pulse edges. In this case the main program enables interrupt service routines as described in the aforementioned reference manual to measure the period or frequency of the signal on wire 16. Other substitutions and modifications may be made in the described embodiment without departing from the spirit and scope of the appended claims.

We claim:

1. A liquid level indicator system including a display responsive to bits of a digital signal for indicating the level of liquid in a container, said system being operable with either an analog type liquid level sensor or a digital type liquid level sensor connected to an input wire, said system including a microprocessor programmed to determine, from a characteristic of a signal on said wire, the type of sensor connected to the wire, the microprocessor being programmed to process the signal on the wire in one way to develop the digital signal for energizing the display when it is determined that an analog type liquid level sensor is connected to the wire and in a second way to develop the digital signal for energizing the display when it is determined that a digital type liquid level sensor is connected to the wire.

2. A liquid level indicator as claimed in claim 1 wherein the microprocessor is programmed to determine if the signal on said wire is an analog signal having a magnitude which varies with the liquid level or a pulse width modulated signal having a duration which varies with the liquid level, said characteristic being a presence or an absence of pulse edges in the signal on said wire.

3. A liquid level indicator as claimed in claim 2 wherein said display is a bar graph.

4. A liquid level indicator as claimed in claim 2 wherein said microprocessor includes an analog to digital converter connected to said wire for sampling and digitizing the magnitude of a signal on said wire when the microprocessor determines that the signal on said wire has no edges, and means for converting the digitized magnitude to signals for driving said display.

5. A liquid level indicator as claimed in claim 4 wherein said microprocessor includes means for measuring the duration of pulses on said wire when the microprocessor detects the presence of pulse edges in the signal on said wire, and means for converting the measured durations to signals for energizing said display.

6. A method for operating a liquid level indicator system with either an analog type liquid level sensor or a digital type liquid level sensor connected to an input wire of the system, the method comprising:

a) sensing samples of a signal on the input wire over an interval of time to detect the presence of negative and positive going pulse edges in the signal;

b) measuring the duration of a pulse between a negative going edge and a positive going edge if both edges are sensed during a sample;

c) at the end of said interval, determining if each sample detected both a negative going and a positive going edge;

d) if step c) determines that both negative and positive going edges were detected in each sample, processing the measured duration of at least one pulse to derive signals for energizing a display; and, e) if step c) determines that both negative and positive going edges were not detected in each sample, digitizing the magnitude of the signal on the wire and processing the digitized magnitude to derive signals for energizing the display.

* * * * *